June 20, 1961 M. B. McKAIG 2,989,594

MAGNETIC TAPE RECORDING AND REPRODUCING MACHINE

Filed June 24, 1953 4 Sheets-Sheet 1

INVENTOR.
MERLE B. McKAIG
BY Roy Mattern Jr.
ATTORNEY

June 20, 1961 M. B. McKAIG 2,989,594

MAGNETIC TAPE RECORDING AND REPRODUCING MACHINE

Filed June 24, 1953 4 Sheets-Sheet 2

INVENTOR.
MERLE B. McKAIG.
BY Roy E. Mattern Jr.
ATTORNEY

INVENTOR.
MERLE B. McKAIG
BY
Roy Mattern Jr.
ATTORNEY

June 20, 1961 M. B. McKAIG 2,989,594

MAGNETIC TAPE RECORDING AND REPRODUCING MACHINE

Filed June 24, 1953 4 Sheets-Sheet 4

INVENTOR.
MERLE B. McKAIG
BY Roy E. Mattern Jr.
ATTORNEY

United States Patent Office 2,989,594
Patented June 20, 1961

2,989,594
MAGNETIC TAPE RECORDING AND REPRODUCING MACHINE

Merle B. McKaig, Seattle, Wash., assignor to McKaig Electronics, Inc., Seattle, Wash., a corporation of Washington Filed June 24, 1953, Ser. No. 363,831
2 Claims. (Cl. 179—100.2)

This invention relates to a magnetic tape recording and reproducing machine and more particularly to apparatus incorporated into the machine for controlling the magnetic tape before and after both recording and playing.

The invention, briefly described, comprises the composite assembly of both recording and reproducing mechanisms, and their associated magnetic tape handling equipment inclusive of drive units, guides and magazines, all of which are arranged so that a recorded portion of the tape can be moved past the playback head immediately after recording, in proper time sequence.

The purpose of the invention is to provide a magnetic tape recording and reproducing machine which can be controlled for the immediate playback of recorded information of any time length up to the maximum operating period of the machine.

The purpose of the invention will become more apparent as the following detailed description of its preferred embodiment as associated with a sound machine is read in conjunction with the drawing wherein like numerals refer to like and corresponding parts throughout the several figures, where:

Figure 2:
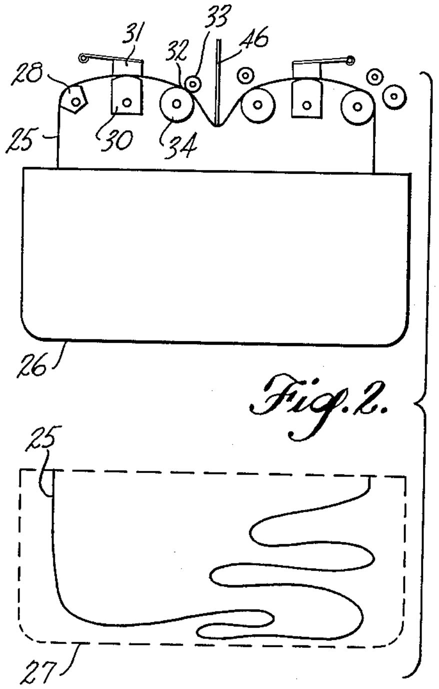
FIGURE 2 is a schematic front elevation of the components shown in FIGURE 1 with the second magazine represented by dotted lines and arranged below the first magazine for allustrative purposes, and the tape is shown in its initial position before recording.
Figure 3:
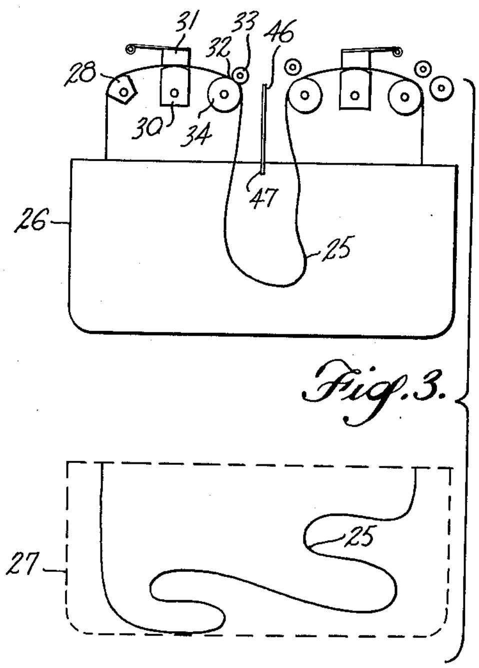

FIGURE 3, similar to FIGURE 2, shows the tape distribution after recording commences.

Figure 4:
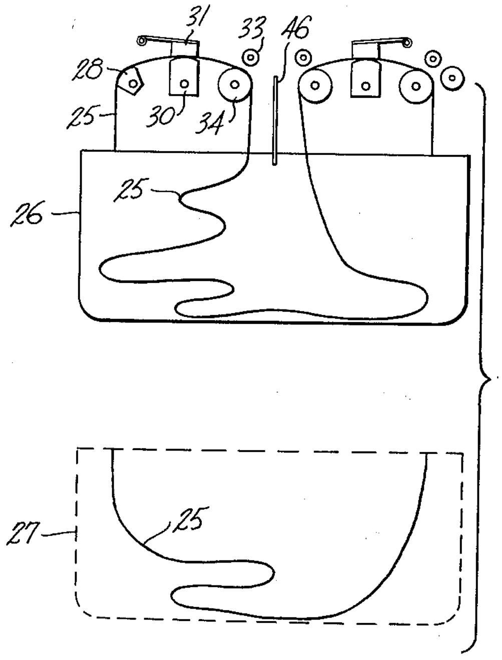

FIGURE 4, similar to FIGURE 2, shows the tape distribution upon the substantial completion of the recording.

Figure 5:
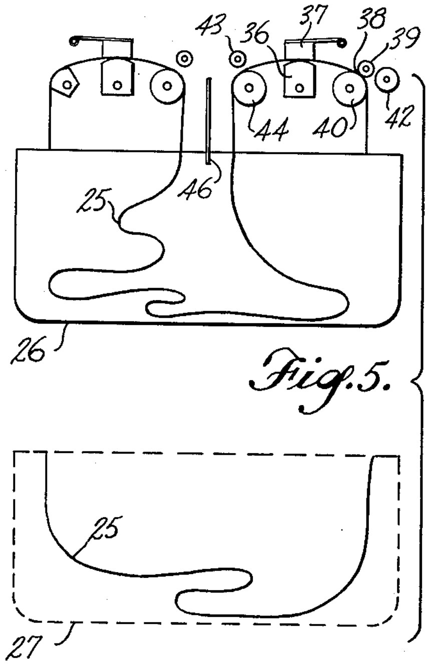

FIGURE 5, similar to FIGURE 2, shows the tape distribution and position of the components as the playback is commenced.

Figure 6:
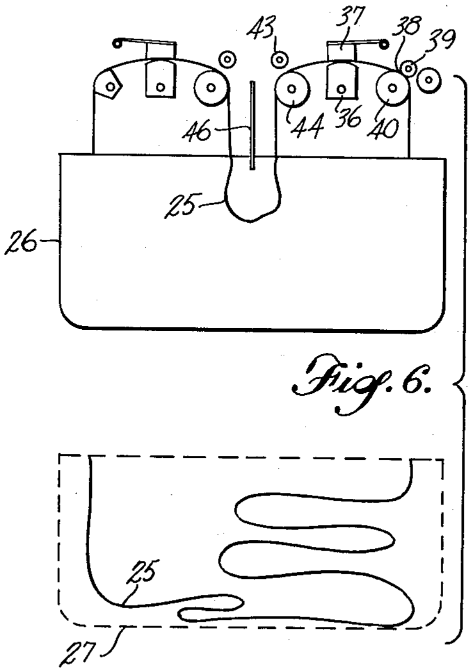

FIGURE 6, similar to FIGURE 2, shows the tape distribution as the playback nears completion.

Figure 7:
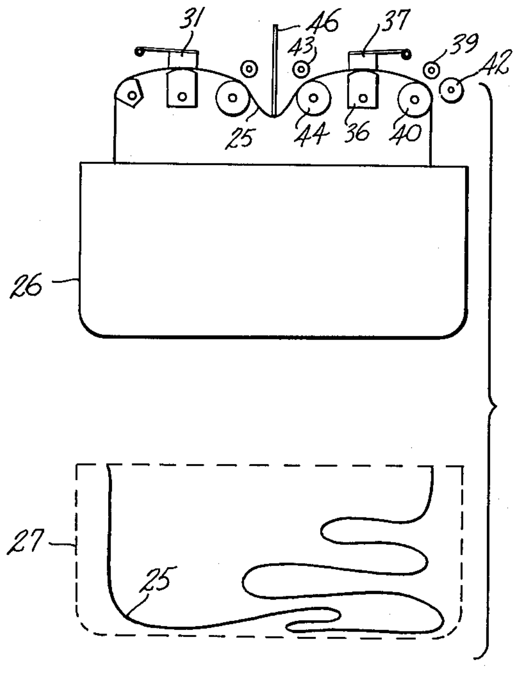

FIGURE 7, similar to FIGURE 2, shows the tape distribution as the playback is completed.

Figure 8:
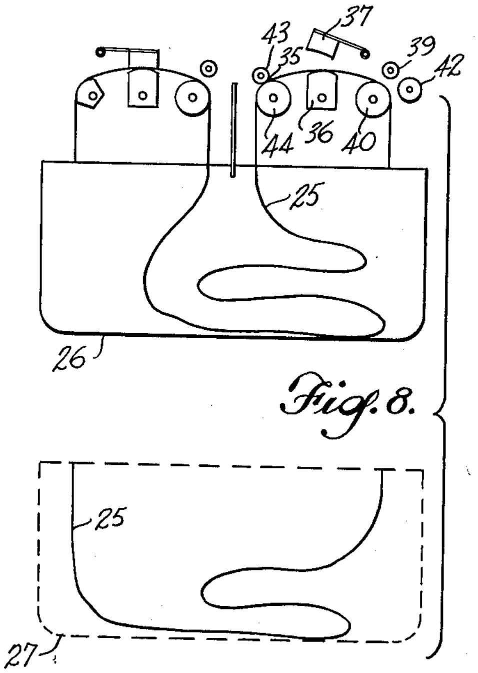

FIGURE 8, similar to FIGURE 2, shows the tape distribution as the recorded tape is reversed and passed by the playing head.

Figure 9:
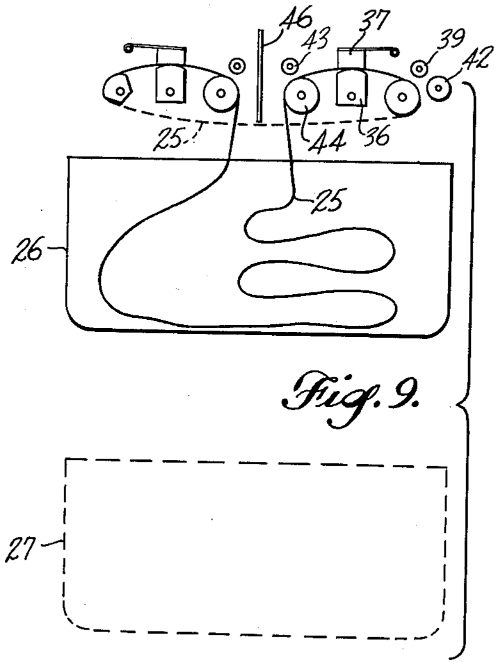
Figure 10:
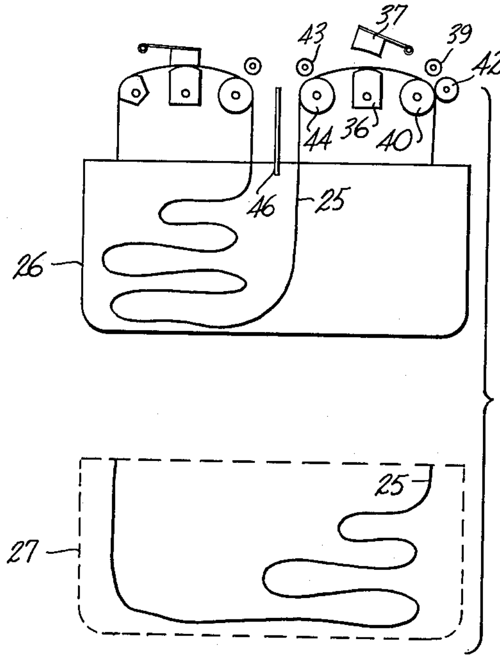

FIGURE 9, similar to FIGURE 2, shows the tape distribution upon the completion of the reverse motion; and, FIGURE 10, similar to FIGURE 2, shows the tape distribution and the position of the components as the tape is rapidly moved forward again past the playing head to eventually acquire its status illustrated in FIGURE 2.

The recording and sound reproducing machine illustrated in these figures is especially suitable for handling a continuous magnetic tape upon which sounds are recorded. Such a tape is recirculated, so to speak, through the machine, an erasing head obliterating recorded portions after they have served their usefulness, such as recordings made at rehearsals for plays, musical performances, public speeches, diction exercises, and other similar functions.

If, on the other hand, recordings are to be made and stored as permanent records, the illustrated machine embodies all of the essential components to make such recordings on a noncontinuous magnetic tape.

If its universal use with both continuous and noncontinuous tape is desired, then additional apparatus such as storage and take up reels (not shown) are required. In either instance, the machine is designed so that the playback of any recorded rendition may be initiated almost immediately at anytime without rewinding or indexing.

Figure 1:
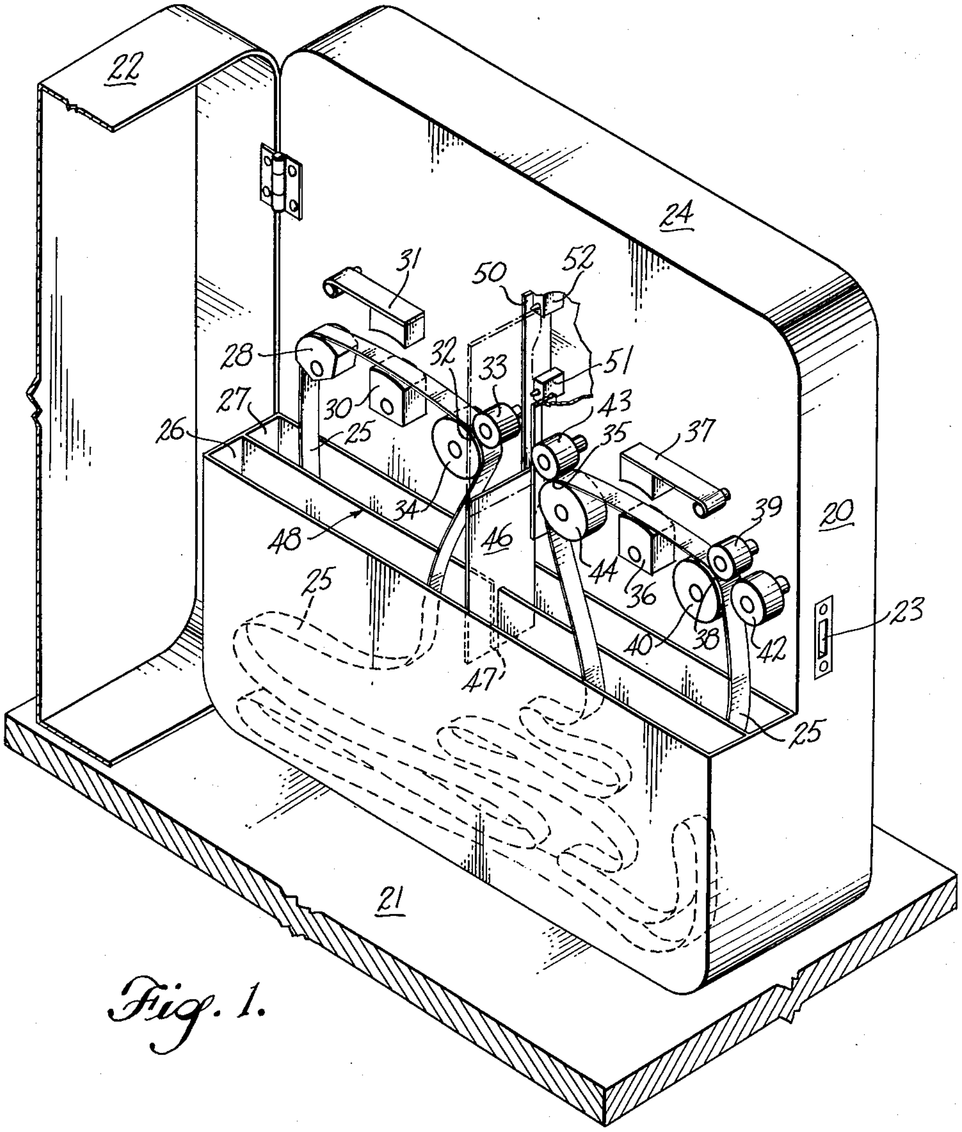
FIGURE 1 is a perspective view of the opened case of the magnetic tape recording and sound reproducing machine showing the preferred arrangement of the components.

This invention, described more particularly and referring first to FIGURE 1, comprises a case or cabinet 20 suitable for resting on a table or shelf 21 and having a hinged cover 22 closed with the clasp 23. When the cover 22 is shut it encloses operating apparatus of the machine which is compactly and uniquely arranged and mounted for operation in the body 24 of the case 20. This operating apparatus comprises all of the magnetic tape processing and handling devices.

The general storage for the tape 25 is provided by two identical magazines 26 and 27 arranged face to face for convenience and utilization of a face common to both. The second magazine is essential where the machine is designed to handle a continuous tape 25 as illustrated in all the figures. The construction of each magazine is the same. Parallel faces separated by a distance only slightly greater than the tape width, form a cavity of some depth but of a greater length in comparison with the depth.

This type of magazine construction is ideally suited for the active storage of the tape 25 with its major surface perpendicular to the faces of the magazine 26 or 27. With the proper size magazine 26 or 27 designed for a specified maximum tape length, either magazine is capable of receiving substantially all of the tape 25 as it is piled up within it loop upon loop. Moreover, the first portions of the tape to be fed into or placed in the magazine 26 or 27 can be withdrawn readily at any time without binding or excessively creasing any portion of the tape 25 that is in the magazine 26 or 27 at the time of the withdrawal.

By using magazines of this type with the apparatus, yet to be described, the basic purpose of the invention, that of immediate playback, is readily accomplished. The recorded portions of tape, temporarily stored in such a magazine, are always accessible for immediate playback.

The remainder of the apparatus is best described by referring to its position and function along the path defined by the traveling tape 25. For the present, magazine 27 will be considered as the storage place for the tape 25 that is to be recorded. The tape 25 upon leaving the magazine 27 passes over a guide 28 which orientates it in preparation for its travel past the erasing and recording head 30. The pressure pad 31, located above the head 30, when properly adjusted, is utilized to maintain the tape 25 in close contact with the head 30. The tape 25 is removed from the magazine 27 and moved over the erasing and recording head 30 by the tape transport mechanism 32 consisting of the drive capstan 33, the movable idler wheel 34 and a power drive (not shown) mounted within the body 24.

When the machine is in operation the drive capstan 33 will turn at all times and the effectiveness of the tape transport mechanism 32, as a whole, in moving the tape 25 will depend on the position of the idler wheel 34. When it is moved to press the tape 25 into contact with the capstan 33, the transport mechanism 32 becomes effective and remains so until the idler wheel 34 is moved away. This manner of operation is utilized throughout the illustrated machine.

The tape 25 upon completion of the recording, drops into the magazine 26 and remains there until a somewhat similar arrangement of apparatus is energized for the purpose of playing back the recorded portions of the tape 25.

The balance of the apparatus yet to be described, includes, in addition to playback apparatus: a means for reversing the tape that has already been played so it may be played again; a means for rapidly withdrawing the tape from the magazine to skip over certain portions of the tape in order to reach other portions for playback; a second magazine 27 to store either unrecorded tape or recorded tape ready for erasing and reuse; and automatic controls to stop the motion of the tape when either magazine is emptied.

The following description more fully explains the position and function of this apparatus in reference to the path defined by the moving tape.

After a recording of a selected duration is completed and playback is desired, the recorded tape 25 is removed from the magazine 26 and passed through a tape transport mechanism 35 which for the present does not drive the tape but its idler wheel 44 serves as a guide orientating the tape 25 before it passes over the playback head 36 and underneath the pressure pad 37. Its motion past this playback apparatus is caused by the tape transport mechanism 38 consisting of the drive capstan 39 and its associated movable idler wheel 40, the drive capstan being powered by a conventional means (not shown) mounted within the body 24.

Associated with the tape transport mechanism 38 is a higher speed drive capstan 42 which becomes effective when the idler wheel 40 presses the tape 25 into contact with it rather than into contact with the drive capstan 39. This is done when a considerable length of tape 25 is to be moved hurriedly past the playback head 36 to reach a selected portion for playback at a normal operating speed.

Following the passage of the tape through this associated playback apparatus, it is dropped into the second magazine 27 located adjacent to the magazine 26. The design of this magazine 27 is identical with the other so the recorded and played tape is conveniently stored without special handling and is available for withdrawal at any time in either direction from the magazine 27, from either the top or bottom as the case may be.

The occasion for withdrawing the tape 25 from the top of the magazine 27 is for the purpose of returning a portion or all of it to the magazine 26 for subsequent replaying. When this is desired, the tape transport mechanism 35, previously referred to when it served as a guide to orientate the tape 25 before it moved past the playback head 36, is made effective as the idler wheel 44 is moved to press the tape 25 into contact with the capstan 43. As this capstan 43 rotates, the tape 25 is removed from the magazine 27 and passed through the guiding transport mechanism 38, over the playback head 36, by the idler 44 and dropped into the magazine 26.

The occasion for withdrawing the recorded and played tape 25 from the bottom of the magazine 27 is for its reuse. It is withdrawn under the power of the tape transport mechanism 32 and moved past the erasing and recording head 30.

This continuous tape circuit as thus described with its independent driving mechanisms necessarily presents the problem of providing a way to assure that the tape will not be damaged, such as by the obvious danger of parting the tape. One conventional means (not shown) that is utilized is a safety device which permits only the alternative use of power to drive the tape in one direction or the other. When the reverse tape transport mechanism 35 is moving the tape 25, it is impossible for the tape transport mechanism 32 or 38, to move the tape 25.

In addition to the safety device just referred to, another means is incorporated into the operator's apparatus consisting of the tape actuated striker 46 which normally rests in an upright position near the top of both magazines 26 and 27, supported in a slot 47 in their common side 48. At anytime when the tape 25 is about to be exhausted from either magazine 26 or 27, the last dwindling loop of tape 25 contacts the striker 46 raising it within its guide 50. In the path of striker 46 are two trigger mechanisms. One trigger mechanism 51 is lower and designed to be effective when the high speed tape drives are in use. The other trigger mechanism 52 is positioned above the first one 51 and is designed to be effective when the tape drives are operated at recording or playing speeds. The variance in the positions of the two mechanisms 51 and 52 is accounted for by recognizing the inevitable difference in the amount of tape transported at the respective operating speeds, between the beginning of the striker action and its culmination.

The actuation of the contacts of either trigger mechanism results in the automatic operation of conventional mechanisms (not shown) mounted in the body 24 that in turn displace the idlers from the drive capstans and reposition the pressure pads to stop the motion of the tape 25 before damage can occur, as will be noted subsequently in conjunction with a summary of the various operating stages of this recording and playing machine.

The operation of the apparatus shown in FIGURE 1 will be more fully understood by referring to FIGURES 2 through 10, inclusive, in conjunction with the following discussion.

The commencement of the initial recording is illustrated schematically in FIGURE 2. The magazine 27, represented by dotted lines, is set apart for illustrative purposes only. All of the magnetic tape 25 except that which has been threaded through the machine is in magazine 27, noted previously as the storage place for new tape and/or recorded tape awaiting reprocessing. To record, the pickup equipment (not shown) is energized and the tape 25 is then withdrawn from the magazine 27, over the guide 28, over the erasing-recording head 30, being held in firm contact with it by the pressure pad 31; this motion occurs as the tape transport mechanism 32 operates to move the tape when the idler 34 presses the tape into contact with the drive capstan 33 which is rotating in a counterclockwise direction.

FIGURE 3 shows the effect of this recording operation on the tape distribution soon after its commencement. The striker 46, originally supported by the tape 25 in its uppermost shutoff position by the minimum length of tape 25 stretched between the erasing-recording and playback heads as shown in FIGURE 2, drops into the slot 47 soon after the motion of the tape 25 is commenced. As the recording continues, the tape 25 feeds into the magazine 26 and withdraws from the magazine 27 until the recording is ended or until the magazine 27 is exhausted. FIGURE 4 illustrates this relocation of the tape 25 at the completion of a recording, showing a portion of tape 25 that remains in the magazine 27 under normal operating conditions.

The motion of the tape 25 is terminated almost instantaneously by release of the pressure exerted by the idler 34, rendering the drive capstan 33 ineffective so that the friction created at the pressure pad 31 results in the almost instantaneous halting of the motion of the tape 25. In this way the effects of inertia are avoided in contrast to how they might have occurred had reels or other similar equipment been utilized to transport and store the tape 25.

The normal playback of this recorded portion of tape 25 in the magazine 26 is accomplished as illustrated in FIGURES 5, 6 and 7. The reproducing equipment (not shown) is energized. Then as the idler 40 presses the tape 25 into contact with the drive capstan 39 that is rotating in a counterclockwise direction, the tape 25 is removed from the magazine 26, pulled over the idler 44, passed between the pressure pad 37 and the playing head 36, carried over the idler 40 and dropped into the magazine 27. This transfer of the tape 25 from the magazine 26 to 27 continues until stopped by the operator of the machine or until the last remaining loop of tape 25 in magazine 26 raises the striker 46. When raised, the striker actuates the trigger mechanism 52 causing the travel of the tape to cease quite suddenly as the idler wheel 40 moves away from the capstan 39 and the frictional effects of the pressure pads 31 and 37 continue, for neither are released at this time.

By comparing FIGURE 2 with FIGURE 7, it will be appreciated that the machine is once again ready to commence a new recording following the procedure outlined above.

If, however, instead of making a new recording, the one just played is to be played again, the operation shown in FIGURE 8 is followed. First the pressure pad 37 is raised clear of the tape 25. Then the idler 44 of the tape transfer mechanism 35 is moved to engage the tape with the capstan 43 rotating in a clockwise direction. This results in the withdrawal of the tape 25 from the magazine 27, over the idler 40, across the playback head 36, then back into the magazine 26 again ready for a repeat playback. The quantity of tape 25 that is returned to magazine 26 can be limited by the operator of the machine by observing a footage indicator (not shown). If, however, the idler 44 is not removed from contact with the tape 25 and the capstan 43 soon enough and the magazine 27 is about to be emptied, the final loop of tape 25 will lift the striker 46 actuating the trigger mechanism 51 to automatically stop the motion of the tape 25. This is done by moving the idler 44 away from the capstan 43 as the pressure pad 37 is lowered to contact the tape as shown in FIGURE 9.

FIGURE 10 illustrates the use of the higher forward speed drive capstan 42 to rapidly withdraw tape 25 from the magazine 26. The pressure pad 37 is moved clear of the tape and thereafter the idler 40 is moved to cause the tape 25 to contact the high speed capstan 42. The tape is then pulled over the idler 44, the playback head 36, and dropped into the magazine 27. This arrangement is suitable when it is desired to empty magazine 26 in preparation for commencing a new recording, or to listen to only selected portions of the recorded tape, moving the remaining portions past the playback head with greater speed.

This apparatus as shown and described in conjunction with sound equipment is equally adaptable for incorporation into other units (not shown), such as motion picture and television equipment or in automatic typing equipment of one kind or another.

Tapes of move and television activities utilized for showng action could be handled in much the same manner as tapes utilized for rendering sounds; or in other words, any use of a tape carrying information lends itself to handling by the apparatus shown and described.

Although only a single embodiment of the invention has been shown and described in detail, it is realized that modifications may be necessary when other embodiments are made and incorporated into equipment similar to that noted previously.

I claim:

1. In a magnetic tape recording and reproducing machine, tape processing and handling apparatus arranged to reproduce immediately any recording in the proper time sequence without the necessity of rewinding or indexing, comprising a continuous magnetic tape, a first storage magazine for receiving the tape and storing it in layers thereby permitting withdrawal of the tape by removal of either the top or bottom layers, a first tape transport mechanism for removing tape from the first magazine, an erasing and recording head for erasing and recording information on the tape as the tape is removed from the first magazine by the first tape transport mechanism, a second storage magazine similar to the first storage magazine for receiving the tape deposited by the first tape transport mechanism, a second tape transport mechanism for removing tape from the second magazine, a reproducing head for reproducing the information on the tape as the tape is removed from the second magazine by the second tape transport mechanism and thereafter lowered into the first magazine completing the passage of the tape through the machine, both the first and second tape transport mechanisms comprising a drive capstan and an idler wheel, the idler wheel being movable toward the rotating drive capstan carrying the tape into contact with the drive capstan so the motion of the tape will continue until the idler wheel is moved away from the rotating drive capstan, and both the first and second magazines having an automatic stopping means to prevent tape separation, the means comprising a striker raised by the last portions of tape leaving a magazine, and actuators tripped by the striker that in turn cause the withdrawal of the idler wheels from drive capstans thereby stopping the motion of the tape.

2. In a magnetic tape recording and reproducing machine, tape processing and handling apparatus comprising a continuous magnetic tape; two tape magazines adjacent to one another, having a common side and each capable of receiving all the tape in layers, one layer forming substantially above the other as the tape is confined by the magazine walls separated by a distance slightly greater than the width of the tape; a combination erasing and recording head located over the second magazine and to one side of its center; a reproducing head located over the first magazine and to the opposite side of its center; a tape transport mechanism to withdraw tape from the first magazine over the erasing and recording head for erasing and recording then dropping it into the second magazine; a second tape transport mechanism to withdraw the tape from the second magazine over the reproducing head for reproducing then dropping it into the first magazine from which it was originally withdrawn; a third tape transport mechanism to reverse the direction of the tape, withdrawing the recorded tape from the first magazine back across the reproducing head in preparation for its second reproduction; a high speed capstan for use with the second tape transport mechanism for rapidly transferring the tape from the second magazine into the first magazine from which it was originally withdrawn to reach selected recordings in the second magazine; each of the tape transport mechanisms comprising a drive capstan and an idler wheel, the idler wheel being movable toward the rotating drive capstan carrying the tape into contact with the drive capstan so the motion of the tape will continue until the idler wheel is moved away from the rotating drive capstan, and each magazine is equipped with an automatic stopping means to prevent tape separation, the means comprising a striker raised by the last portions of tape leaving a magazine, and actuators tripped by the striker that in turn cause the withdrawal of the idler wheels from drive capstans thereby stopping motion of the tape.

References Cited in the file of this patent

UNITED STATES PATENTS

| | | |
|---|---|---|
| 2,410,569 | Conant | Nov. 5, 1946 |
| 2,542,506 | Gibson | Feb. 20, 1951 |
| 2,543,843 | Barrett | Feb. 27, 1951 |
| 2,679,394 | Lear | May 25, 1954 |
| 2,742,284 | Munroe | Apr. 17, 1956 |

FOREIGN PATENTS

| | | |
|---|---|---|
| 153,064 | Australia | Aug. 23, 1951 |
| 688,567 | Great Britain | Mar. 11, 1953 |